(12) United States Patent
Marchais et al.

(10) Patent No.: US 11,263,877 B2
(45) Date of Patent: *Mar. 1, 2022

(54) IDENTIFYING MECHANICAL IMPEDANCE OF AN ELECTROMAGNETIC LOAD USING A TWO-TONE STIMULUS

(71) Applicant: Cirrus Logic International Semiconductor Ltd., Edinburgh (GB)

(72) Inventors: Emmanuel Marchais, Austin, TX (US); Eric Lindemann, Austin, TX (US); Carl L. Ståhl, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/906,576

(22) Filed: Jun. 19, 2020

(65) Prior Publication Data

US 2020/0320834 A1 Oct. 8, 2020

Related U.S. Application Data

(63) Continuation of application No. 16/556,897, filed on Aug. 30, 2019, now Pat. No. 10,726,683.

(Continued)

(51) Int. Cl.
*G08B 3/10* (2006.01)
*G08B 6/00* (2006.01)
*G08B 7/00* (2006.01)

(52) U.S. Cl.
CPC ............ *G08B 3/10* (2013.01); *G08B 3/1025* (2013.01); *G08B 3/1041* (2013.01); *G08B 6/00* (2013.01); *G08B 7/00* (2013.01)

(58) Field of Classification Search
CPC . G08G 1/00; G08G 1/087; G08G 1/09; G08B 6/00; G08B 7/00; G08B 7/02;

(Continued)

(56) References Cited

U.S. PATENT DOCUMENTS 3,686,927 A   8/1972 Scharton
4,902,136 A   2/1990 Mueller et al.
(Continued)

FOREIGN PATENT DOCUMENTS

AU    2002347829       4/2003
CN    103165328 A      6/2013
(Continued)

OTHER PUBLICATIONS

First Examination Opinion Notice, State Intellectual Property Office of the People's Republic of China, Application No. 201880037435. X, dated Dec. 31, 2020.

(Continued)

*Primary Examiner* — Van T Trieu
(74) *Attorney, Agent, or Firm* — Jackson Walker L.L.P.

(57) ABSTRACT

A method for identifying a mechanical impedance of an electromagnetic load may include generating a waveform signal for driving an electromagnetic load, the waveform signal comprising a first tone at a first driving frequency and a second tone at a second driving frequency. The method may also include during driving of the electromagnetic load by the waveform signal or a signal derived therefrom, receiving a current signal representative of a current associated with the electromagnetic load and a back electromotive force signal representative of a back electromotive force associated with the electromagnetic load. The method may further include determining amplitude and phase information of the current signal responsive to the first tone and second tone, determining amplitude and phase information of the back electromotive force signal responsive to the first tone and second tone, and identifying parameters of the mechanical impedance of the electromagnetic load based on the amplitude and phase information of the current signal (Continued)

and the amplitude and phase information of the back electromotive force signal.

12 Claims, 2 Drawing Sheets

Related U.S. Application Data (60) Provisional application No. 62/852,970, filed on Mar. 29, 2019.

(58) Field of Classification Search
CPC ..... G08B 7/06; G08B 3/00; G08B 3/10; G08B 3/1008; G08B 3/1016; G08B 3/1025; G08B 3/1041; G06F 1/16; G06F 1/1663; H03H 17/00; H03H 17/06; H03H 7/12; H03H 17/12
See application file for complete search history.

(56) References Cited

U.S. PATENT DOCUMENTS

| | | | |
|---|---|---|---|
| 5,684,722 A | 11/1997 | Thorner et al. | |
| 5,748,578 A | 5/1998 | Schell | |
| 5,857,986 A | 1/1999 | Moriyasu | |
| 6,050,393 A | 4/2000 | Murai et al. | |
| 6,278,790 B1 | 8/2001 | Davis et al. | |
| 6,332,029 B1 | 12/2001 | Azima et al. | |
| 6,388,520 B2 | 5/2002 | Wada et al. | |
| 6,567,478 B2 | 5/2003 | Oishi et al. | |
| 6,580,796 B1 | 6/2003 | Kuroki | |
| 6,683,437 B2 | 1/2004 | Tierling | |
| 6,703,550 B2 | 3/2004 | Chu | |
| 6,762,745 B1 | 7/2004 | Braun et al. | |
| 6,768,779 B1 | 7/2004 | Nielsen | |
| 6,784,740 B1 | 8/2004 | Tabatabaei | |
| 6,906,697 B2 | 6/2005 | Rosenberg | |
| 6,995,747 B2 | 2/2006 | Casebolt et al. | |
| 7,154,470 B2 | 12/2006 | Tierling | |
| 7,277,678 B2 | 10/2007 | Rozenblit et al. | |
| 7,333,604 B2 | 2/2008 | Zernovizky et al. | |
| 7,392,066 B2 | 6/2008 | Haparnas | |
| 7,456,688 B2 | 11/2008 | Okazaki et al. | |
| 7,623,114 B2 | 11/2009 | Rank | |
| 7,639,232 B2 | 12/2009 | Grant et al. | |
| 7,791,588 B2 | 9/2010 | Tierling et al. | |
| 7,979,146 B2 | 7/2011 | Ullrich et al. | |
| 8,068,025 B2 | 11/2011 | Devenyi et al. | |
| 8,098,234 B2 | 1/2012 | Lacroix et al. | |
| 8,102,364 B2 | 1/2012 | Tierling | |
| 8,325,144 B1 | 12/2012 | Tierling et al. | |
| 8,427,286 B2 | 4/2013 | Grant et al. | |
| 8,441,444 B2 | 5/2013 | Moore et al. | |
| 8,466,778 B2 | 6/2013 | Hwang et al. | |
| 8,480,240 B2 | 7/2013 | Kashiyama | |
| 8,572,293 B2 | 10/2013 | Cruz-Hernandez et al. | |
| 8,572,296 B2 | 10/2013 | Cruz-Hernandez et al. | |
| 8,593,269 B2 | 11/2013 | Grant et al. | |
| 8,648,829 B2 | 2/2014 | Shahoian et al. | |
| 8,659,208 B1 | 2/2014 | Rose et al. | |
| 8,754,757 B1 | 6/2014 | Ullrich et al. | |
| 8,947,216 B2 | 2/2015 | Da Costa et al. | |
| 8,981,915 B2 | 3/2015 | Birnbaum et al. | |
| 8,994,518 B2 | 3/2015 | Gregorio et al. | |
| 9,030,428 B2 | 5/2015 | Fleming | |
| 9,063,570 B2 | 6/2015 | Weddle et al. | |
| 9,083,821 B2 | 7/2015 | Hughes | |
| 9,092,059 B2 | 7/2015 | Bhatia | |
| 9,117,347 B2 | 8/2015 | Matthews | |
| 9,128,523 B2 | 9/2015 | Buuck et al. | |
| 9,164,587 B2 | 10/2015 | Da Costa et al. | |
| 9,196,135 B2 | 11/2015 | Shah et al. | |
| 9,248,840 B2 | 2/2016 | Truong | |
| 9,326,066 B2 | 4/2016 | Klippel | |
| 9,329,721 B1 | 5/2016 | Buuck et al. | |
| 9,354,704 B2 | 5/2016 | Lacroix et al. | |
| 9,368,005 B2 | 6/2016 | Cruz-Hernandez et al. | |
| 9,489,047 B2 | 11/2016 | Jiang et al. | |
| 9,495,013 B2 | 11/2016 | Underkoffler et al. | |
| 9,507,423 B2 | 11/2016 | Gandhi et al. | |
| 9,513,709 B2 | 12/2016 | Gregorio et al. | |
| 9,520,036 B1 | 12/2016 | Buuck | |
| 9,588,586 B2 | 3/2017 | Rihn | |
| 9,640,047 B2 | 5/2017 | Choi et al. | |
| 9,652,041 B2 | 5/2017 | Jiang et al. | |
| 9,696,859 B1 | 7/2017 | Heller et al. | |
| 9,697,450 B1 | 7/2017 | Lee | |
| 9,715,300 B2 | 7/2017 | Sinclair et al. | |
| 9,740,381 B1 | 8/2017 | Chaudhri et al. | |
| 9,842,476 B2 | 12/2017 | Rihn et al. | |
| 9,864,567 B2 | 1/2018 | Seo | |
| 9,881,467 B2 | 1/2018 | Levesque | |
| 9,886,829 B2 | 2/2018 | Levesque | |
| 9,946,348 B2 | 4/2018 | Ullrich et al. | |
| 9,947,186 B2 | 4/2018 | Macours | |
| 9,959,744 B2 | 5/2018 | Koskan et al. | |
| 9,965,092 B2 | 5/2018 | Smith | |
| 10,032,550 B1 | 7/2018 | Zhang et al. | |
| 10,055,950 B2 | 8/2018 | Saboune et al. | |
| 10,074,246 B2 | 9/2018 | Da Costa et al. | |
| 10,110,152 B1 | 10/2018 | Hajati | |
| 10,171,008 B2 | 1/2019 | Nishitani et al. | |
| 10,175,763 B2 | 1/2019 | Shah | |
| 10,264,348 B1 | 4/2019 | Harris et al. | |
| 10,447,217 B2 | 10/2019 | Zhao et al. | |
| 10,564,727 B2 | 2/2020 | Billington et al. | |
| 10,620,704 B2 | 4/2020 | Rand et al. | |
| 10,667,051 B2 | 5/2020 | Stahl | |
| 10,726,683 B1 * | 7/2020 | Marchais | B06B 1/04 |
| 10,732,714 B2 | 8/2020 | Rao et al. | |
| 10,782,785 B2 | 9/2020 | Hu et al. | |
| 10,795,443 B2 | 10/2020 | Hu et al. | |
| 10,820,100 B2 | 10/2020 | Stahl et al. | |
| 10,828,672 B2 | 11/2020 | Stahl et al. | |
| 10,832,537 B2 | 11/2020 | Doy et al. | |
| 10,848,886 B2 | 11/2020 | Rand | |
| 10,969,871 B2 | 4/2021 | Rand et al. | |
| 2001/0043714 A1 | 11/2001 | Asada et al. | |
| 2002/0018578 A1 | 2/2002 | Burton | |
| 2002/0085647 A1 | 7/2002 | Oishi et al. | |
| 2003/0068053 A1 | 4/2003 | Chu | |
| 2003/0214485 A1 | 11/2003 | Roberts | |
| 2005/0031140 A1 | 2/2005 | Browning | |
| 2005/0134562 A1 | 6/2005 | Grant et al. | |
| 2006/0028095 A1 | 2/2006 | Maruyama et al. | |
| 2006/0197753 A1 | 9/2006 | Hotelling | |
| 2006/0284856 A1 | 12/2006 | Soss | |
| 2007/0241816 A1 | 10/2007 | Okazaki et al. | |
| 2008/0077367 A1 | 3/2008 | Odajima | |
| 2008/0226109 A1 | 9/2008 | Yamakata et al. | |
| 2008/0240458 A1 | 10/2008 | Goldstein et al. | |
| 2008/0293453 A1 | 11/2008 | Atlas et al. | |
| 2008/0316181 A1 | 12/2008 | Nurmi | |
| 2009/0020343 A1 | 1/2009 | Rothkopf et al. | |
| 2009/0079690 A1 | 3/2009 | Watson et al. | |
| 2009/0088220 A1 | 4/2009 | Persson | |
| 2009/0096632 A1 | 4/2009 | Ullrich et al. | |
| 2009/0102805 A1 | 4/2009 | Meijer et al. | |
| 2009/0128306 A1 | 5/2009 | Luden et al. | |
| 2009/0153499 A1 | 6/2009 | Kim et al. | |
| 2009/0278819 A1 | 11/2009 | Goldenberg et al. | |
| 2010/0013761 A1 | 1/2010 | Birnbaum et al. | |
| 2010/0085317 A1 | 4/2010 | Park et al. | |
| 2010/0141408 A1 | 6/2010 | Doy et al. | |
| 2010/0260371 A1 | 10/2010 | Afshar | |
| 2010/0261526 A1 | 10/2010 | Anderson et al. | |
| 2011/0056763 A1 | 3/2011 | Tanase et al. | |
| 2011/0075835 A1 | 3/2011 | Hill | |
| 2011/0141052 A1 | 6/2011 | Bernstein et al. | |
| 2011/0161537 A1 | 6/2011 | Chang | |
| 2011/0163985 A1 | 7/2011 | Bae et al. | |
| 2011/0167391 A1 | 7/2011 | Momeyer et al. | |
| 2012/0011436 A1 | 1/2012 | Jinkinson et al. | |

(56) References Cited

U.S. PATENT DOCUMENTS

| | | |
|---|---|---|
| 2012/0105358 A1 | 5/2012 | Momeyer et al. |
| 2012/0112894 A1 | 5/2012 | Fang et al. |
| 2012/0206246 A1 | 8/2012 | Cruz-Hernandez et al. |
| 2012/0206247 A1 | 8/2012 | Bhatia et al. |
| 2012/0229264 A1 | 9/2012 | Company Bosch et al. |
| 2012/0253698 A1 | 10/2012 | Cokonaj |
| 2012/0306631 A1 | 12/2012 | Hughes |
| 2013/0016855 A1 | 1/2013 | Lee et al. |
| 2013/0027359 A1 | 1/2013 | Schevin et al. |
| 2013/0038792 A1 | 2/2013 | Quigley et al. |
| 2013/0096849 A1 | 4/2013 | Campbell et al. |
| 2013/0141382 A1 | 6/2013 | Simmons et al. |
| 2013/0275058 A1 | 10/2013 | Awad |
| 2013/0289994 A1 | 10/2013 | Newman et al. |
| 2014/0056461 A1 | 2/2014 | Afshar |
| 2014/0064516 A1 | 3/2014 | Cruz-Hernandez et al. |
| 2014/0079248 A1 | 3/2014 | Short et al. |
| 2014/0085064 A1 | 3/2014 | Crawley et al. |
| 2014/0118125 A1 | 5/2014 | Bhatia |
| 2014/0118126 A1 | 5/2014 | Garg et al. |
| 2014/0119244 A1 | 5/2014 | Steer et al. |
| 2014/0139327 A1 | 5/2014 | Bau et al. |
| 2014/0226068 A1 | 8/2014 | Lacroix et al. |
| 2014/0292501 A1 | 10/2014 | Lim et al. |
| 2014/0340209 A1 | 11/2014 | Lacroix et al. |
| 2014/0347176 A1 | 11/2014 | Modarres et al. |
| 2015/0061846 A1 | 3/2015 | Yliaho |
| 2015/0070149 A1 | 3/2015 | Cruz-Hernandez et al. |
| 2015/0070151 A1 | 3/2015 | Cruz-Hernandez et al. |
| 2015/0070260 A1 | 3/2015 | Saboune et al. |
| 2015/0084752 A1 | 3/2015 | Heubel et al. |
| 2015/0130767 A1 | 5/2015 | Myers et al. |
| 2015/0208189 A1 | 7/2015 | Tsai |
| 2015/0216762 A1 | 8/2015 | Oohashi et al. |
| 2015/0234464 A1 | 8/2015 | Yliaho |
| 2015/0324116 A1 | 11/2015 | Marsden et al. |
| 2015/0325116 A1 | 11/2015 | Umminger, III |
| 2015/0341714 A1 | 11/2015 | Ahn et al. |
| 2016/0004311 A1 | 1/2016 | Yliaho |
| 2016/0007095 A1 | 1/2016 | Lacroix |
| 2016/0063826 A1 | 3/2016 | Morrell et al. |
| 2016/0070392 A1 | 3/2016 | Wang et al. |
| 2016/0074278 A1 | 3/2016 | Muench et al. |
| 2016/0132118 A1 | 5/2016 | Park et al. |
| 2016/0141606 A1 | 5/2016 | Ahn et al. |
| 2016/0162031 A1 | 6/2016 | Westerman et al. |
| 2016/0179203 A1 | 6/2016 | Modarres et al. |
| 2016/0239089 A1 | 8/2016 | Taninaka et al. |
| 2016/0246378 A1 | 8/2016 | Sampanes et al. |
| 2016/0291731 A1 | 10/2016 | Liu et al. |
| 2016/0358605 A1 | 12/2016 | Ganong, III et al. |
| 2017/0052593 A1 | 2/2017 | Jiang et al. |
| 2017/0078804 A1 | 3/2017 | Guo et al. |
| 2017/0083096 A1 | 3/2017 | Rihn et al. |
| 2017/0090572 A1 | 3/2017 | Holenarsipur et al. |
| 2017/0090573 A1 | 3/2017 | Hajati et al. |
| 2017/0153760 A1 | 6/2017 | Chawda et al. |
| 2017/0168574 A1 | 6/2017 | Zhang |
| 2017/0169674 A1 | 6/2017 | Macours |
| 2017/0220197 A1 | 8/2017 | Matsumoto et al. |
| 2017/0256145 A1 | 9/2017 | Macours et al. |
| 2017/0277350 A1 | 9/2017 | Wang et al. |
| 2017/0357440 A1 | 12/2017 | Tse |
| 2018/0059733 A1 | 3/2018 | Gault et al. |
| 2018/0059793 A1 | 3/2018 | Hajati |
| 2018/0067557 A1 | 3/2018 | Robert et al. |
| 2018/0074637 A1 | 3/2018 | Rosenberg et al. |
| 2018/0082673 A1 | 3/2018 | Tzanetos |
| 2018/0084362 A1 | 3/2018 | Zhang et al. |
| 2018/0151036 A1 | 5/2018 | Cha et al. |
| 2018/0158289 A1 | 6/2018 | Vasilev et al. |
| 2018/0159452 A1 | 6/2018 | Eke et al. |
| 2018/0159457 A1 | 6/2018 | Eke |
| 2018/0159545 A1 | 6/2018 | Eke et al. |
| 2018/0160227 A1 | 6/2018 | Lawrence et al. |
| 2018/0165925 A1 | 6/2018 | Israr et al. |
| 2018/0178114 A1 | 6/2018 | Mizuta et al. |
| 2018/0182212 A1 | 6/2018 | Li et al. |
| 2018/0183372 A1 | 6/2018 | Li et al. |
| 2018/0196567 A1 | 7/2018 | Klein et al. |
| 2018/0237033 A1 | 8/2018 | Hakeem et al. |
| 2018/0253123 A1 | 9/2018 | Levesque et al. |
| 2018/0255411 A1 | 9/2018 | Lin et al. |
| 2018/0267897 A1 | 9/2018 | Jeong |
| 2018/0294757 A1 | 10/2018 | Feng et al. |
| 2018/0301060 A1 | 10/2018 | Israr et al. |
| 2018/0321748 A1 | 11/2018 | Rao et al. |
| 2018/0329172 A1 | 11/2018 | Tabuchi |
| 2018/0335848 A1 | 11/2018 | Moussette et al. |
| 2018/0367897 A1 | 12/2018 | Bjork et al. |
| 2019/0020760 A1 | 1/2019 | DeBates et al. |
| 2019/0227628 A1 | 1/2019 | Rand et al. |
| 2019/0064925 A1 | 2/2019 | Kim et al. |
| 2019/0069088 A1 | 2/2019 | Seiler |
| 2019/0073078 A1 | 3/2019 | Sheng et al. |
| 2019/0103829 A1 | 4/2019 | Vasudevan et al. |
| 2019/0138098 A1 | 5/2019 | Shah |
| 2019/0163234 A1 | 5/2019 | Kim et al. |
| 2019/0196596 A1 | 6/2019 | Yokoyama et al. |
| 2019/0206396 A1 | 7/2019 | Chen |
| 2019/0215349 A1 | 7/2019 | Adams et al. |
| 2019/0220095 A1 | 7/2019 | Ogita et al. |
| 2019/0228619 A1 | 7/2019 | Yokoyama et al. |
| 2019/0114496 A1 | 8/2019 | Lesso |
| 2019/0235629 A1 | 8/2019 | Hu et al. |
| 2019/0294247 A1 | 9/2019 | Hu et al. |
| 2019/0296674 A1 | 9/2019 | Janko et al. |
| 2019/0297418 A1 | 9/2019 | Stahl |
| 2019/0311590 A1 | 10/2019 | Doy et al. |
| 2019/0341903 A1 | 11/2019 | Kim |
| 2020/0117506 A1 | 4/2020 | Chan |
| 2020/0218352 A1 | 7/2020 | Macours et al. |
| 2020/0313654 A1* | 10/2020 | Marchais ............... G01H 15/00 |
| 2021/0108975 A1 | 4/2021 | Peso Parada et al. |
| 2021/0365118 A1 | 11/2021 | Rajapurkar et al. |

FOREIGN PATENT DOCUMENTS

| | | |
|---|---|---|
| CN | 103403796 A | 11/2013 |
| CN | 204903757 U | 12/2015 |
| CN | 105264551 A | 1/2016 |
| CN | 106438890 A | 2/2017 |
| CN | 106950832 A | 7/2017 |
| CN | 107665051 A | 2/2018 |
| EP | 0784844 B1 | 6/2005 |
| EP | 2363785 A1 | 9/2011 |
| EP | 2487780 A1 | 8/2012 |
| EP | 2600225 A1 | 6/2013 |
| EP | 2846218 A1 | 3/2015 |
| EP | 2846229 A2 | 3/2015 |
| EP | 2846329 A1 | 3/2015 |
| EP | 2988528 A1 | 2/2016 |
| EP | 3125508 A1 | 2/2017 |
| EP | 3379382 A1 | 9/2018 |
| IN | 201747044027 | 8/2018 |
| JP | H02130433 B2 | 5/1990 |
| JP | 08149006 A | 6/1996 |
| JP | 6026751 B2 | 11/2016 |
| JP | 6250985 | 12/2017 |
| JP | 6321351 | 5/2018 |
| KR | 20120126446 A | 11/2012 |
| WO | 2013104919 A1 | 7/2013 |
| WO | 2013186845 A1 | 12/2013 |
| WO | 2014018086 A1 | 1/2014 |
| WO | 2014094283 A1 | 6/2014 |
| WO | 2016105496 A1 | 6/2016 |
| WO | 2016164193 A1 | 10/2016 |
| WO | 2017113651 A1 | 7/2017 |
| WO | 2018053159 A1 | 3/2018 |
| WO | 2018067613 A1 | 4/2018 |
| WO | 2018125347 A1 | 7/2018 |

(56) References Cited

FOREIGN PATENT DOCUMENTS

| WO | 2020004840 A1 | 1/2020 |
|---|---|---|
| WO | 2020055405 A1 | 3/2020 |

OTHER PUBLICATIONS

Invitation to Pay Additional Fees, Partial International Search Report and Provisional Opinion of the International Searching Authority, International Application No. PCT/US2020/052537, dated Jan. 14, 2021.
International Search Report and Written Opinion of the International Searching Authority, International Application No. PCT/US2020/056610, dated Jan. 21, 2021.
International Search Report and Written Opinion of the International Searching Authority, International Application No. PCT/GB2020/052537, dated Mar. 9, 2021.
International Search Report and Written Opinion of the International Searching Authority, International Application No. PCT/GB2019/050964, dated Sep. 3, 2019.
International Search Report and Written Opinion of the International Searching Authority, International Application No. PCT/GB2019/050770, dated Jul. 5, 2019.
Communication Relating to the Results of the Partial International Search, and Provisional Opinion Accompanying the Partial Search Result, of the International Searching Authority, International Application No. PCT/US2018/031329, dated Jul. 20, 2018.
Combined Search and Examination Report, UKIPO, Application No. GB1720424.9, dated Jun. 5, 2018.
International Search Report and Written Opinion of the International Searching Authority, International Application No. PCT/GB2019/052991, dated Mar. 17, 2020.
Communication Relating to the Results of the Partial International Search, and Provisional Opinion Accompanying the Partial Search Result, of the International Searching Authority, International Application No. PCT/GB2020/050822, dated Jul. 9, 2020.
International Search Report and Written Opinion of the International Searching Authority, International Application No. PCT/GB2020/050823, dated Jun. 30, 2020.
International Search Report and Written Opinion of the International Searching Authority, International Application No. PCT/GB2020/051037, dated Jul. 9, 2020.
International Search Report and Written Opinion of the International Searching Authority, International Application No. PCT/GB2020/051035, dated Jul. 10, 2020.
International Search Report and Written Opinion of the International Searching Authority, International Application No. PCT/US2020/023342, dated Jun. 9, 2020.
International Search Report and Written Opinion of the International Searching Authority, International Application No. PCT/US2020/024864, dated Jul. 6, 2020.
International Search Report and Written Opinion of the International Searching Authority, International Application No. PCT/GB2020/050822, dated Aug. 31, 2020.
International Search Report and Written Opinion of the International Searching Authority, International Application No. PCT/GB2020/051438, dated Sep. 28, 2020.
Gottfried Behler: "Measuring the Loudspeaker's Impedance during Operation for the Derivation of the Voice Coil Temperature", AES Convention Preprint, Feb. 25, 1995 (Feb. 25, 1995), Paris.
First Office Action, China National Intellectual Property Administration, Patent Application No. 2019800208570, dated Jun. 3, 2021.
International Search Report and Written Opinion of the International Searching Authority, International Application No. PCT/US2021/021908, dated Jun. 9, 2021.
Notice of Preliminary Rejection, Korean Intellectual Property Office, Application No. 10-2019-7036236, dated Jun. 29, 2021.
Combined Search and Examination Report, United Kingdom Intellectual Property Office, Application No. GB2018051.9, dated Jun. 30, 2021.
Communication pursuant to Rule 164(2)(b) and Article 94(3) EPC, European Patent Office, Application No. 18727512.8, dated Jul. 8, 2021.
First Office Action, CN Patent Application No. 2019800211287, China National Intellectual Property Administration, dated Jul. 5, 2021.
United Kingdom Patent Application No. GB201620746D0, filed Dec. 6, 2016.
Steinbach et al., Haptic Data Compression and Communication, IEEE Signal Processing Magazine, Jan. 2011.
Pezent et al., Syntacts Open-Source Software and Hardware for Audio-Controlled Haptics, IEEE Transactions on Haptics, vol. 14, No. 1, Jan.-Mar. 2021.
Final Notice of Preliminary Rejection, Korean Patent Office, Application No. 10-2019-7036236, dated Nov. 29, 2021.
Examination Report under Section 18(3), United Kingdom Intellectual Property Office, Application No. GB2018050.1, dated Dec. 22, 2021.

* cited by examiner

IDENTIFYING MECHANICAL IMPEDANCE OF AN ELECTROMAGNETIC LOAD USING A TWO-TONE STIMULUS

RELATED APPLICATIONS

The present disclosure is a continuation of U.S. Non-Provisional patent application Ser. No. 16/556,897, filed Aug. 30, 2019, issued as U.S. Pat. No. 10,726,683 on Jul. 28, 2020, which claims priority to U.S. Provisional Patent Application Ser. No. 62/825,970, filed Mar. 29, 2019, each of which is incorporated by reference herein in its entirety.

FIELD OF DISCLOSURE

The present disclosure relates in general to tracking and identifying a mechanical impedance of an electromagnetic load, for example, a haptic transducer.

BACKGROUND

Vibro-haptic transducers, for example linear resonant actuators (LRAs), are widely used in portable devices such as mobile phones to generate vibrational feedback to a user. Vibro-haptic feedback in various forms creates different feelings of touch to a user's skin, and may play increasing roles in human-machine interactions for modern devices.

An LRA may be modelled as a mass-spring electromechanical vibration system. When driven with appropriately designed or controlled driving signals, an LRA may generate certain desired forms of vibrations. For example, a sharp and clear-cut vibration pattern on a user's finger may be used to create a sensation that mimics a mechanical button click. This clear-cut vibration may then be used as a virtual switch to replace mechanical buttons.

Figure 1:
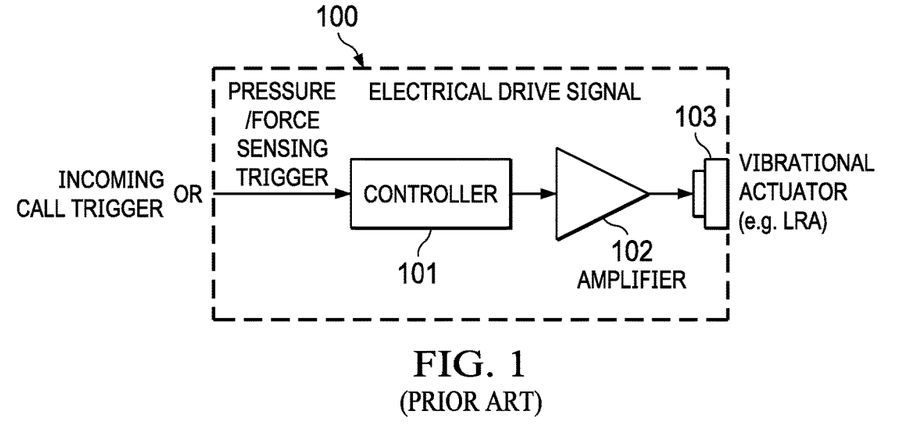
FIG. 1 illustrates an example of a vibro-haptic system in a device, as is known in the art.

FIG. 1 illustrates an example of a vibro-haptic system in a device 100. Device 100 may comprise a controller 101 configured to control a signal applied to an amplifier 102. Amplifier 102 may then drive a haptic transducer 103 based on the signal. Controller 101 may be triggered by a trigger to output to the signal. The trigger may for example comprise a pressure or force sensor on a screen or virtual button of device 100.

Among the various forms of vibro-haptic feedback, tonal vibrations of sustained duration may play an important role to notify the user of the device of certain predefined events, such as incoming calls or messages, emergency alerts, and timer warnings, etc. In order to generate tonal vibration notifications efficiently, it may be desirable to operate the haptic actuator at its resonance frequency.

The resonance frequency $f_0$ of a haptic transducer may be approximately estimated as:

$$f_0 = \frac{1}{2\pi\sqrt{CM}} \quad (1)$$

where C is the compliance of the spring system, and M is the equivalent moving mass, which may be determined based on both the actual moving part in the haptic transducer and the mass of the portable device holding the haptic transducer.

Due to sample-to-sample variations in individual haptic transducers, mobile device assembly variations, temporal component changes caused by aging, and use conditions such as various different strengths of a user gripping of the device, the vibration resonance of the haptic transducer may vary from time to time.

Figure 2:
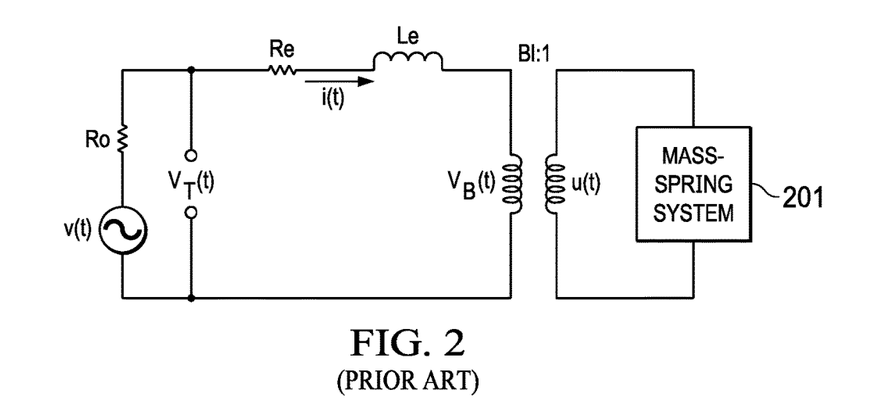
FIG. 2 illustrates an example of a Linear Resonant Actuator (LRA) modelled as a linear system, as is known in the art.

FIG. 2 illustrates an example of a linear resonant actuator (LRA) modelled as a linear system. LRAs are non-linear components that may behave differently depending on, for example, the voltage levels applied, the operating temperature, and the frequency of operation. However, these components may be modelled as linear components within certain conditions. In this example, the LRA is modelled as a third order system having electrical and mechanical elements. In particular, Re and Le are the DC resistance and coil inductance of the coil-magnet system, respectively; and Bl is the magnetic force factor of the coil. The driving amplifier outputs the voltage waveform V(t) with the output impedance Ro. The terminal voltage $V_T(t)$ may be sensed across the terminals of the haptic transducer. The mass-spring system 201 moves with velocity u(t).

In a system having an electromagnetic load such as an LRA, it may be desirable to determine the parameters that define an impedance of the electromagnetic load. Knowledge of such parameters may allow for optimization of playback of signals (e.g., playback of haptic waveforms) to the electromagnetic load. In addition, determination of electromagnetic load impedance may be valuable as it may allow for adapting of a playback signal to allow the playback signal to track changing parameters of the electromagnetic load.

An electromagnetic load such as an LRA may be characterized by its impedance $Z_{Lra}$ as seen as the sum of a coil impedance $Z_{coil}$ and a mechanical impedance $Z_{mech}$:

$$Z_{Lra} = Z_{coil} + Z_{mech} \quad (2)$$

Coil impedance $Z_{coil}$ may in turn comprise a direct current (DC) resistance Re in series with an inductance Le:

$$Z_{coil} = Re + sLe \quad (3)$$

Mechanical impedance $Z_{mech}$ may be defined by three parameters including a resistance at resonance $R_{ES}$, an angular resonant frequency $\omega_0$ (e.g., $\omega_0 = 2\pi f_0$), and a quality factor q. Or equivalently, mechanical impedance $Z_{mech}$ may be defined by three parameters including the resistance at resonance $R_{ES}$, a capacitance $C_{MES}$ representing an electrical capacitance representative of an equivalent moving mass M of the spring system of haptic transducer, and inductance $L_{CES}$ representative of a compliance C of the spring system. The relationship among these quantities may be given by the following equations, in which s is the Laplace transform variable:

$$Z_{mech} = R_{ES} \frac{\frac{1}{q\omega_0}s}{1 + \frac{1}{q\omega_0}s + \frac{1}{q\omega_0}s^2} \quad (4)$$

$$q = \frac{R_{ES}}{(Bl)^2}\left(\frac{M}{C}\right)^{\frac{1}{2}} = R_{ES}\left(\frac{C_{MES}}{L_{CES}}\right)^{\frac{1}{2}} \quad (5)$$

$$\omega_0 = \frac{1}{\sqrt{C_{MES}L_{CES}}} \quad (6)$$

Traditional approaches for driving an LRA at resonance rely on detecting a time difference between zero crossings of the LRA's back electromotive force (back-EMF) and the load current or voltage. Such difference may then be used to adjust a period of a signal driven to the LRA. One disadvantage of this approach is its sensitivity to noise because all of the noise power is essentially aliased by an effective sampling rate at approximately two times the resonance frequency. Such approach may also suffer from slow convergence if a loop filter is used to reduce sensitivity to noise, because as a rule of thumb, bandwidth of the loop filter should be one-tenth of the effective sampling rate (or less). Further, using such approaches and LRA may be tri-stated at zero crossing events in order to allow a reading of back-EMF, which may result in a loss of drive duty cycle (e.g., maximum power from a driving amplifier may not be delivered to the LRA).

Existing approaches to determining a complex impedance may include using broadband noise to excite a system having an electromagnetic load. For example, using existing approaches, a Fast Fourier Transform of current and voltage waveforms associated with the electromagnetic load may be performed to determine impedance.

SUMMARY

In accordance with the teachings of the present disclosure, the disadvantages and problems associated with identifying a mechanical impedance of an electromagnetic load may be reduced or eliminated.

In accordance with embodiments of the present disclosure, a system for identifying a mechanical impedance of an electromagnetic load may include a signal generator and mechanical impedance identity circuitry. The signal generator may be configured to generate a waveform signal for driving an electromagnetic load, the waveform signal comprising a first tone at a first driving frequency and a second tone at a second driving frequency. The mechanical impedance identity circuitry may be configured to, during driving of the electromagnetic load by the waveform signal or a signal derived therefrom, receive a current signal representative of a current associated with the electromagnetic load and a back electromotive force signal representative of a back electromotive force associated with the electromagnetic load. The mechanical impedance identity circuitry may further be configured to determine amplitude and phase information of the current signal responsive to the first tone and second tone, determine amplitude and phase information of the back electromotive force signal responsive to the first tone and second tone, and identify parameters of the mechanical impedance of the electromagnetic load based on the amplitude and phase information of the current signal and the amplitude and phase information of the back electromotive force signal.

In accordance with these and embodiments of the present disclosure, a method for identifying a mechanical impedance of an electromagnetic load may include generating a waveform signal for driving an electromagnetic load, the waveform signal comprising a first tone at a first driving frequency and a second tone at a second driving frequency. The method may also include during driving of the electromagnetic load by the waveform signal or a signal derived therefrom, receiving a current signal representative of a current associated with the electromagnetic load and a back electromotive force signal representative of a back electromotive force associated with the electromagnetic load. The method may further include determining amplitude and phase information of the current signal responsive to the first tone and second tone, determining amplitude and phase information of the back electromotive force signal responsive to the first tone and second tone, and identifying parameters of the mechanical impedance of the electromagnetic load based on the amplitude and phase information of the current signal and the amplitude and phase information of the back electromotive force signal.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiment discussed below, and all such equivalents should be deemed as being encompassed by the present disclosure.

Various electronic devices or smart devices may have transducers, speakers, and acoustic output transducers, for example any transducer for converting a suitable electrical driving signal into an acoustic output such as a sonic pressure wave or mechanical vibration. For example, many electronic devices may include one or more speakers or loudspeakers for sound generation, for example, for playback of audio content, voice communications and/or for providing audible notifications.

Such speakers or loudspeakers may comprise an electromagnetic actuator, for example a voice coil motor, which is mechanically coupled to a flexible diaphragm, for example a conventional loudspeaker cone, or which is mechanically coupled to a surface of a device, for example the glass screen of a mobile device. Some electronic devices may also include acoustic output transducers capable of generating ultrasonic waves, for example for use in proximity detection type applications and/or machine-to-machine communication.

Many electronic devices may additionally or alternatively include more specialized acoustic output transducers, for example, haptic transducers, tailored for generating vibrations for haptic control feedback or notifications to a user. Additionally or alternatively an electronic device may have a connector, e.g., a socket, for making a removable mating connection with a corresponding connector of an accessory apparatus and may be arranged to provide a driving signal to the connector so as to drive a transducer, of one or more of the types mentioned above, of the accessory apparatus when connected. Such an electronic device will thus comprise driving circuitry for driving the transducer of the host device or connected accessory with a suitable driving signal. For acoustic or haptic transducers, the driving signal will generally be an analog time varying voltage signal, for example, a time varying waveform.

As previously mentioned, identifying a mechanical impedance of an electromagnetic load may be useful for some types of haptic application. In the present disclosure, and as described in greater detail below, a two-tone stimulus may be used to excite an electromagnetic load to provide four measurable parameters: an amplitude and phase of the electromagnetic load associated with each of the tones. Three of these four measurable parameters may then be chosen to determine the parameters (angular resonant frequency $\omega_0$, quality factor q, and resistance at resonance $R_{ES}$) of mechanical impedance $Z_{mech}$.

Figure 3:
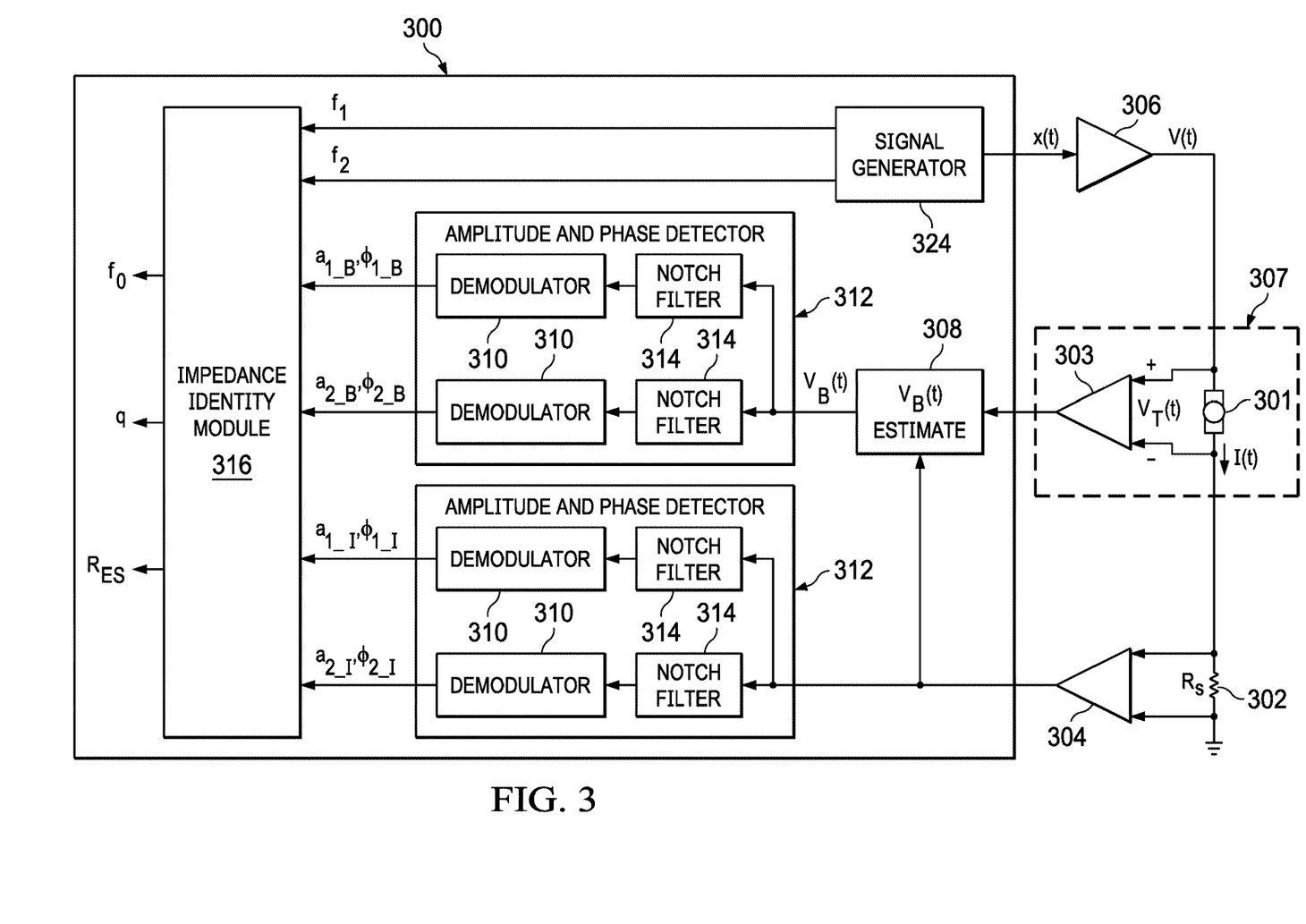
FIG. 3 illustrates an example system for identifying mechanical impedance of an electromagnetic load, in accordance with embodiments of the present disclosure.

FIG. 3 illustrates an example system 300 for identifying mechanical impedance of an electromagnetic load (e.g., haptic transducer 301), in accordance with embodiments of the present disclosure. In some embodiments, system 300 may be integral to a host device comprising system 300 and haptic transducer 301. Such device may include, without limitation, a mobile device, home application, a vehicle, and/or any other system, device, or apparatus that includes a human-machine interface.

In operation, a signal generator 324 of system 300 may generate a waveform signal x(t) with two tones, one at a first frequency $f_1$ and another at a second frequency $f_2$. For example, waveform signal x(t) may be given as:

$$x(t) = a_1 \sin(2\pi f_1 + \phi_1) + a_2 \sin(2\pi f_2 + \phi_2)$$

where $a_1$ is the amplitude of the first tone, $\phi_1$ is the phase of the first tone, $a_2$ is the amplitude of the second tone, and $\phi_2$ is the phase of the second tone.

Waveform signal x(t) may in turn be amplified by amplifier 306 to generate the driving signal V(t) for driving haptic transducer 301.

Responsive to driving signal V(t), a sensed terminal voltage $V_T(t)$ of haptic transducer 301 may be converted to a digital representation by a first analog-to-digital converter (ADC) 303. Similarly, sensed current I(t) may be converted to a digital representation by a second ADC 304. Current I(t) may be sensed across a shunt resistor 302 having resistance Rs coupled to a terminal of haptic transducer 301. The terminal voltage $V_T(t)$ may be sensed by a terminal voltage sensing block 307, for example a volt meter.

As shown in FIG. 3, system 300 may include a back-EMF estimate block 308 that may estimate back-EMF voltage $V_B(t)$. In general, back EMF voltage $V_B(t)$ may not be directly measured from outside of the haptic transducer. However, the terminal voltage $V_T(t)$ measured at the terminals of the haptic transducer, may be related to $V_B(t)$ by:

$$V_T(t) = V_B(t) + Re \cdot I(t) + Le \cdot \frac{dI(t)}{dt} \quad (7)$$

where the parameters are defined as described with reference to FIG. 2. Consequently, back-EMF voltage $V_B(t)$ may be estimated according to equation (7) which may be rearranged as:

$$V_B(t) = V_T(t) - Re \cdot I(t) - Le \cdot \frac{dI(t)}{dt} \quad (8)$$

In some embodiments, back-EMF estimate block 308 may be implemented as a digital filter with a proportional and parallel difference path. The estimates of DC resistance Re and inductance Le may not need to be accurate (e.g., within an approximate 10% error may be acceptable), and thus, fixed values from an offline calibration or from a data sheet specification may be sufficient.

As further shown below, mechanical impedance $Z_{mech}$ may be defined by the relationship between back-EMF voltage $V_B(t)$ and current I(t). Accordingly, system 300 may include amplitude and phase detectors 312 configured to receive back-EMF voltage $V_B(t)$ and current I(t) respectively. Each amplitude and phase detector 312 may include a pair of notch filters 314: one notch filter 314 for filtering out the tone at first frequency $f_1$ and the other notch filter 314 for filtering out the tone at second frequency $f_2$. In some embodiments, notch filters 314 may be eliminated if the filter bandwidth of demodulators 310 (e.g., the low pass filters demodulators 310 discussed below) are limited to less than that of the difference of the frequencies frequency $f_1$ and $f_2$.

Each of the signals modulated by notch filters 314 may be demodulated by respective demodulators 310 to generate an amplitude and phase for such signal. For example, a first demodulator 310 may demodulate the estimated back-EMF voltage $V_B(t)$ generated from the tone at first frequency $f_1$ to generate a measured amplitude $a_{1\_B}$ and measured phase $\phi_{1\_B}$ (relative to the carrier) for such signal. In addition, a second demodulator 310 may demodulate the estimated back-EMF voltage $V_B(t)$ generated from the tone at second frequency $f_2$ to generate a measured amplitude $a_{2\_B}$ and measured phase $\phi_{2\_B}$ (relative to the carrier) for such signal. Further, a third demodulator 310 may demodulate the current I(t) generated from the tone at first frequency $f_1$ to generate a measured amplitude $a_{1\_I}$ and measured phase $\phi_{1\_I}$ (relative to the carrier) for such signal. Moreover, a fourth demodulator 310 may demodulate the current I(t) generated from the tone at second frequency $f_1$ to generate a measured amplitude $a_{2\_I}$ and measured phase $\phi_{2\_I}$ (relative to the carrier) for such signal.

Figure 4:
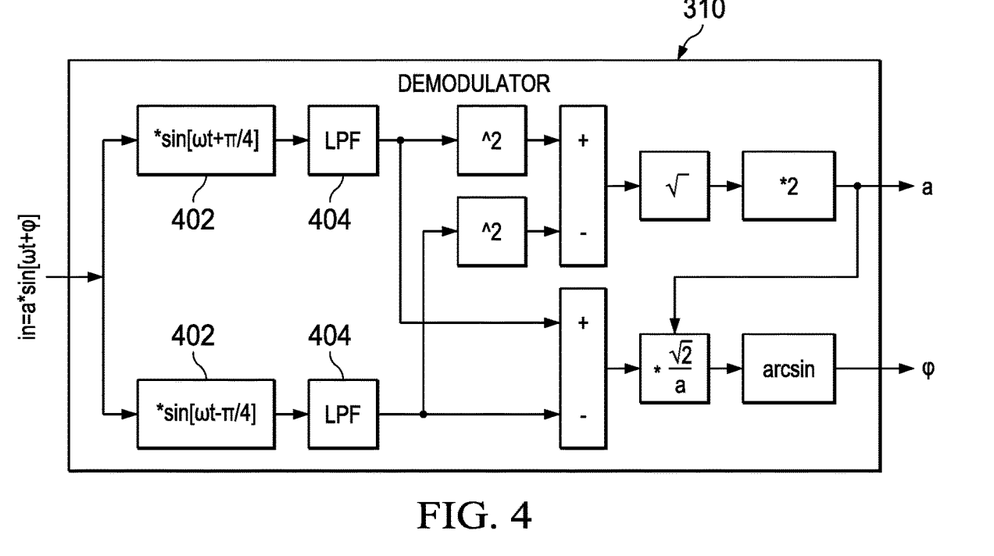
FIG. 4 illustrates an example demodulator, in accordance with embodiments of the present disclosure.

Turning briefly to FIG. 4, FIG. 4 illustrates an example demodulator 310 that may be used to implement one or more of demodulators 310 shown in FIG. 3, in accordance with embodiments of the present disclosure. As shown in FIG. 4, demodulator 310 may be implemented by multiplying an input tone IN (IN=a sin($\omega$t+$\phi$)), where a is the amplitude, $\omega$ is the angular frequency, and $\phi$ is the phase of the signal relative to the carrier with a sinusoid (block 402) having the same frequency. Low-pass filters 404 may be necessary to eliminate alternating current (AC) products of the demodulation.

Turning again to FIG. 3, system 300 may include an impedance identity module 316 configured to combine the four resulting measurements of amplitude and phase for each tone together with knowledge of first frequency $f_1$ and second frequency $f_2$ to compute parameters (e.g., angular resonant frequency $\omega_0$, quality factor q, and resistance at resonance $R_{ES}$) of mechanical impedance $Z_{mech}$. Although four difference values may be calculated for the differences of the amplitudes and phases of estimated back-EMF voltage $V_B(t)$ and measured current I(t) of the two tones, only three difference values may be needed to the determination of the parameters defining mechanical impedance $Z_{mech}$.

For example, in some embodiments, impedance identity module 316 may use the amplitudes of back-EMF voltage $V_B(t)$ and measured current $I(t)$ at one of first frequency $f_1$, the phase differences of back-EMF voltage $V_B(t)$ and measured current $I(t)$ at first frequency $f_1$, and the phase differences of back-EMF voltage $V_B(t)$ and measured current $I(t)$ at second frequency $f_2$, to generate intermediate calculations for a mechanical impedance $Z_{mech\_f_1}$ at first frequency $f_1$, a phase difference $\Delta\phi_1$ between estimated back-EMF voltage $V_B(t)$ and measured current $I(t)$ at first frequency $f_1$, and a phase difference $\Delta\phi_2$ between estimated back-EMF voltage $V_B(t)$ and measured current $I(t)$ at second frequency $f_2$, given as follows:

$$Z_{mech\_f_1} = \frac{a_{1\_B}}{a_{1\_I}} \tag{9}$$

$$\Delta\phi_1 = \phi_{1\_B} - \phi_{1\_I} \tag{10}$$

$$\Delta\phi_2 = \phi_{2\_B} - \phi_{2\_I} \tag{11}$$

Using these intermediate values, resonant frequency $$f_0\left(f_0 = \frac{\omega_0}{2\pi}\right),$$

quality factor q, and resistance at resonance $R_{ES}$ of mechanical impedance $Z_{mech}$ may be identified as follows:

$$f_0 = \sqrt{\left\{f_1\left[f_1 + (f_2^2 - f_1^2)\frac{\sin(\frac{\pi}{2}-\Delta\phi_2)\cos(\frac{\pi}{2}\Delta\phi_1)}{f_1\sin(\frac{\pi}{2}-\Delta\phi_2)\cos(\frac{\pi}{2}-\Delta\phi_1)-}\right]\right\}} \tag{12}$$

$$q = \frac{f_0}{f_2^2 - f_1^2} \frac{f_1\sin(\frac{\pi}{2}-\Delta\phi_2)\cos(\frac{\pi}{2}\Delta\phi_1) - f_2\sin(\frac{\pi}{2}-\Delta\phi_1)\cos(\frac{\pi}{2}\Delta\phi_2)}{\sin(\frac{\pi}{2}-\Delta\phi_1)\sin(\frac{\pi}{2}-\Delta\phi_2)} \tag{13}$$

$$R_{ES} = Z_{mech\_f_1}\sqrt{1 + q^2\left(\frac{f_0}{f_1} - \frac{f_1}{f_0}\right)} \tag{14}$$

While the foregoing contemplates the calculation of particular parameters of mechanical impedance $Z_{mech}$, namely resonant frequency $f_0$, quality factor q, and resistance at resonance $R_{ES}$, it is understood that systems and methods similar to that disclosed herein may be used to identify one or more other parameters for mechanical impedance $Z_{mech}$.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system for identifying a mechanical impedance of an electromagnetic load comprising:
mechanical impedance identity circuitry configured to:
during driving of the electromagnetic load by a waveform signal comprising a first tone at a first driving frequency and a second tone at a second driving frequency or a signal derived from the waveform signal, receive:
a current signal representative of a current associated with the electromagnetic load; and
a back electromotive force signal representative of a back electromotive force associated with the electromagnetic load;

determine amplitude and phase information of the current signal responsive to the first tone and second tone;

determine amplitude and phase information of the back electromotive force signal responsive to the first tone and second tone; and identify parameters of the mechanical impedance of the electromagnetic load based on the amplitude and phase information of the current signal and the amplitude and phase information of the back electromotive force signal.

2. The system of claim 1, wherein the electromagnetic load comprises a haptic transducer.

3. The system of claim 1, wherein the electromagnetic load comprises a linear resonant actuator.

4. The system of claim 1, wherein the mechanical impedance identity circuitry is further configured to:

determine amplitude and phase information of the current signal responsive to the first tone by:
  filtering the current signal to remove components of the current signal responsive to the second tone; and
  demodulating the current signal as filtered to remove components of the current signal responsive to the second tone;

determine amplitude and phase information of the current signal responsive to the second tone by:
  filtering the current signal to remove components of the current signal responsive to the first tone; and
  demodulating the current signal as filtered to remove components of the current signal responsive to the first tone;

determine amplitude and phase information of the back electromotive force signal responsive to the first tone by:
  filtering the back electromotive force signal to remove components of the current signal responsive to the second tone; and
  demodulating the back electromotive force signal as filtered to remove components of the current signal responsive to the second tone; and determine amplitude and phase information of the back electromotive force signal responsive to the second tone by:
  filtering the back electromotive force signal to remove components of the current signal responsive to the first tone; and
  demodulating the back electromotive force signal as filtered to remove components of the current signal responsive to the first tone.

5. The system of claim 4, wherein identifying parameters of the mechanical impedance of the electromagnetic load based on the amplitude and phase information of the current signal and the amplitude and phase information of the back electromotive force signal comprises identifying parameters of the mechanical impedance of the electromagnetic load based on three of the following:

a mechanical impedance of the electromagnetic load at the first driving frequency;

a mechanical impedance of the electromagnetic load at the second driving frequency;

a phase difference between the current signal responsive to the first tone and the back electromotive force responsive to the first tone; and a phase difference between the current signal responsive to the second tone and the back electromotive force responsive to the second tone.

6. The system of claim 1, wherein the parameters of the mechanical impedance of the electromagnetic load comprise a mechanical resistance of the electromagnetic load at resonance, a resonant frequency of the electromagnetic load, and a quality factor of the electromagnetic load.

7. A method for identifying a mechanical impedance of an electromagnetic load comprising:

during driving of the electromagnetic load by a waveform signal comprising a first tone at a first driving frequency and a second tone at a second driving frequency or a signal derived from the waveform signal, receiving:
  a current signal representative of a current associated with the electromagnetic load; and
  a back electromotive force signal representative of a back electromotive force associated with the electromagnetic load;

determining amplitude and phase information of the current signal responsive to the first tone and second tone;

determining amplitude and phase information of the back electromotive force signal responsive to the first tone and second tone; and identifying parameters of the mechanical impedance of the electromagnetic load based on the amplitude and phase information of the current signal and the amplitude and phase information of the back electromotive force signal.

8. The method of claim 7, wherein the electromagnetic load comprises a haptic transducer.

9. The method of claim 7, wherein the electromagnetic load comprises a linear resonant actuator.

10. The method of claim 7, further comprising:

determining amplitude and phase information of the current signal responsive to the first tone by:
  filtering the current signal to remove components of the current signal responsive to the second tone; and
  demodulating the current signal as filtered to remove components of the current signal responsive to the second tone;

determining amplitude and phase information of the current signal responsive to the second tone by:
  filtering the current signal to remove components of the current signal responsive to the first tone; and
  demodulating the current signal as filtered to remove components of the current signal responsive to the first tone;

determining amplitude and phase information of the back electromotive force signal responsive to the first tone by:
  filtering the back electromotive force signal to remove components of the current signal responsive to the second tone; and
  demodulating the back electromotive force signal as filtered to remove components of the current signal responsive to the second tone; and determining amplitude and phase information of the back electromotive force signal responsive to the second tone by:
  filtering the back electromotive force signal to remove components of the current signal responsive to the first tone; and
  demodulating the back electromotive force signal as filtered to remove components of the current signal responsive to the first tone.

11. The method of claim 10, wherein identifying parameters of the mechanical impedance of the electromagnetic load based on the amplitude and phase information of the current signal and the amplitude and phase information of the back electromotive force signal comprises identifying parameters of the mechanical impedance of the electromagnetic load based on three of the following:
- a mechanical impedance of the electromagnetic load at the first driving frequency;
- a mechanical impedance of the electromagnetic load at the second driving frequency;
- a phase difference between the current signal responsive to the first tone and the back electromotive force responsive to the first tone; and
- a phase difference between the current signal responsive to the second tone and the back electromotive force responsive to the second tone.

12. The method of claim 7, wherein the parameters of the mechanical impedance of the electromagnetic load comprise a mechanical resistance of the electromagnetic load at resonance, a resonant frequency of the electromagnetic load, and a quality factor of the electromagnetic load.

* * * * *